United States Patent [19]

Schmitt-Matzen et al.

[11] Patent Number: 5,102,095
[45] Date of Patent: Apr. 7, 1992

[54] FLOW RESTRICTOR FOR SOLENOID VALVE

[75] Inventors: Eric J. Schmitt-Matzen, Gloucester; George T. Bata, Grafton, both of Va.

[73] Assignee: Siemens Automotive L.P., Auburn Hills, Mich.

[21] Appl. No.: 646,301

[22] Filed: Jan. 28, 1991

[51] Int. Cl.⁵ .................. F16K 41/08; F15D 1/14
[52] U.S. Cl. .................. 251/117; 251/127; 251/129.15; 138/42; 138/44
[58] Field of Search .......... 251/117, 127, 129.15; 138/42, 44

[56] References Cited

U.S. PATENT DOCUMENTS

| | | | |
|---|---|---|---|
| 1,086,260 | 2/1914 | Abels | 251/127 X |
| 4,466,462 | 8/1984 | Morris | 138/42 |
| 4,484,597 | 11/1984 | Bravo | 251/127 X |

Primary Examiner—Arnold Rosenthal
Attorney, Agent, or Firm—George L. Boller; Russel C. Wells

[57] ABSTRACT

The flow restrictor is a unitary one-piece element that can be fabricated from either metal or plastic by casting or molding. In use, it is press fitted into a bore in a solenoid valve body to provide a certain restrictive effect. It has a circular cylindrical central core that has a series of flanges that are axially spaced by gaps. Each flange has a circular outer edge that is interrupted by at least one axially extending through-notch. These notches are arranged to provide a tortuous path for the fluid flow, and sized to create a desired restriction. The restrictor provides two parallel flow paths, one, the tortuous path just described, and two, a through-hole through the core of the restrictor.

11 Claims, 2 Drawing Sheets

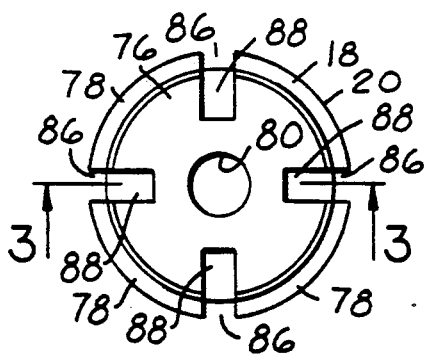
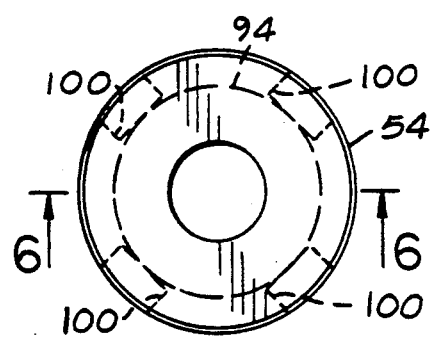
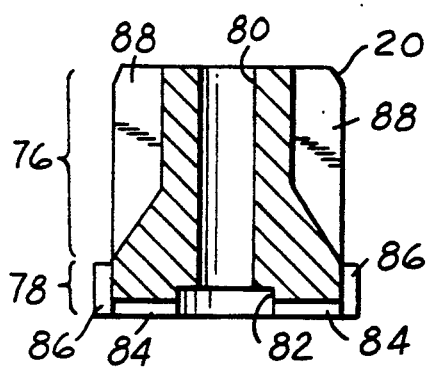
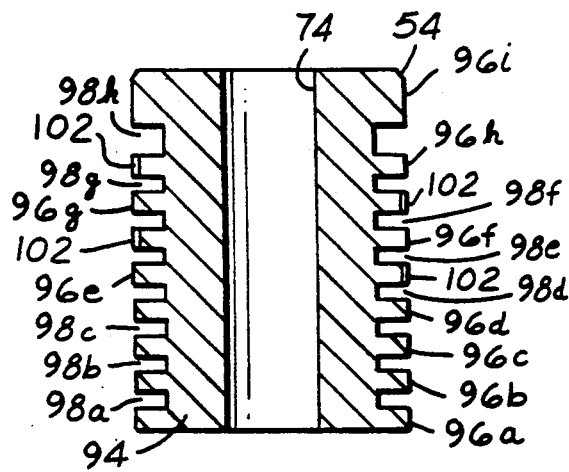
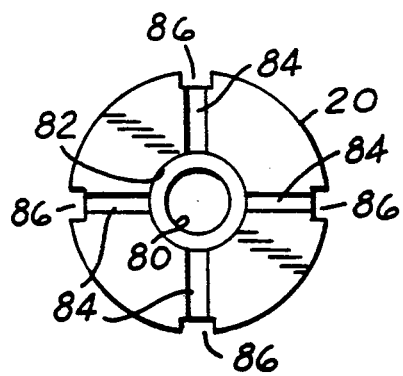
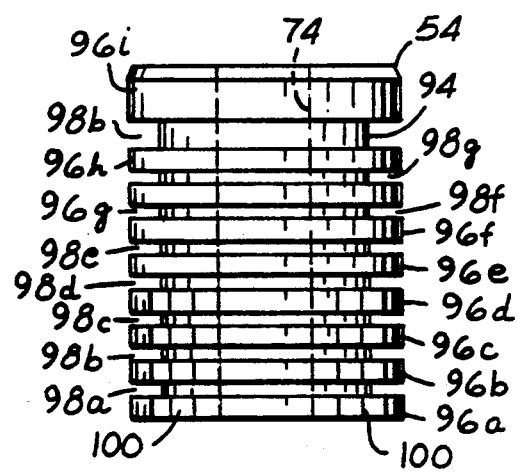

FLOW RESTRICTOR FOR SOLENOID VALVE

FIELD OF THE INVENTION

This invention relates generally to fluid flow restrictors and particularly to a fluid flow restrictor that is used in a solenoid-operated hydraulic valve.

BACKGROUND AND SUMMARY OF THE INVENTION

Prior flow restrictors have been constructed by stacking a series of metal discs to which the flow restrictions have been imparted by processes such as chemical etching or electric discharge machining. The cost of these processes is relatively expensive, and the processes themselves are relatively slow. As the number of discs in a stack increased, a larger internal volume was required to accommodate the stack. Because the prior discs were metal, only limited temperature compensation for fluid viscosity effects across a large temperature range was possible. When it was necessary for the device containing the stack to have a parallel flow path, it had to be machined in another location, and this resulted in increased overall size.

The present invention relates to a new and improved fluid flow restrictor which possesses important advantages over prior ones. The fluid flow restrictor of the present invention is a unitary one-piece element that is adapted for fabrication using either metal or plastic. For instance, the element can be fabricated as an aluminum or zinc die casting, or it can be fabricated as an injection molded plastic. Where flow restrictors are required in several different models which handle several different flow rates, a single element can be tailored to the requirements of each particular model by an appropriate shearing operation. A flow restrictor of the invention can be adapted for laminar or turbulent flow, and thereby be adapted to embody the self-cleaning effect of prior flow restrictors. Because a flow restrictor of the present invention can be fabricated from any of numerous available materials, it is better adapted to compensate for temperature-induced fluid viscosity changes by appropriate selection of material. Where a device that incorporates a flow restrictor of the present invention requires a parallel flow path, such a path is readily incorporated as a through-hole passing through the core of the flow restrictor.

The foregoing, as well as additional features, advantages, and benefits of the invention, will be seen in the ensuing description and claims, which are accompanied by drawings. The drawings disclose a presently preferred embodiment of the invention according to the best mode contemplated at the present time in carrying out the invention.

BRIEF DESCRIPTION OF THE DRAWINGS

FIG. 2 is an axial end view of one of the elements of the solenoid valve of FIG. 1 shown by itself apart from the valve.

FIG. 3 is a transverse cross-sectional view taken in the direction of arrows 3—3 in FIG. 2.

FIG. 4 is a view of the opposite axial end of FIG. 2.

FIG. 5 is an axial end view of the fluid flow restrictor element by itself apart from the valve of FIG. 1.

FIG. 6 is a longitudinal cross-sectional view taken in the direction of arrows 6—6 in FIG. 5

FIG. 7 is a longitudinal view of the fluid flow restrictor element.

DESCRIPTION OF THE PREFERRED EMBODIMENT

Figure 1:
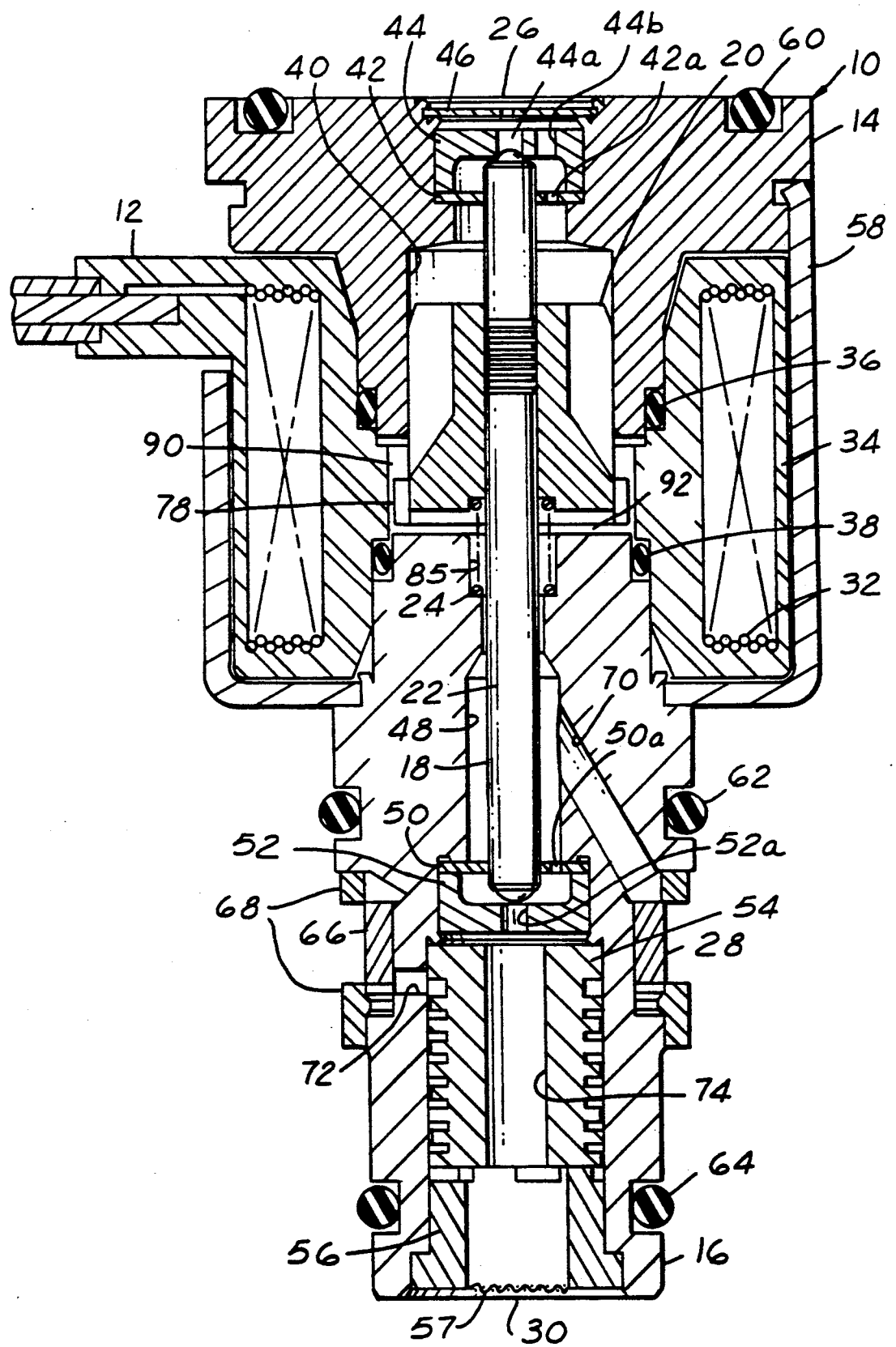
FIG. 1 is a longitudinal cross-sectional view through a solenoid valve embodying a fluid flow restrictor according to the invention.

FIG. 1 illustrates a solenoid valve 10 which comprises: a solenoid coil 12; two valve body pieces 14 and 16; an armature assembly 18 which consists of an armature piece 20 and a needle, or shaft, 22; and a helical coil spring 24. The valve has plural ports 26, 28, and 30, and internal passageway structure that communicates the ports.

Solenoid coil 12 comprises a length of magnet wire that is wound into a tubular coil 32. Coil 32 is itself encapsulated within a suitable encapsulating material 34 so that the solenoid coil also possesses a tubular shape. The ends of the wire forming coil 32 are connected to respective wires 35 that are brought out of encapsulating material 34 to provide for the electrical connection of the solenoid coil in a suitable electrical control circuit (not shown) for selectively energizing the solenoid coil.

Valve body piece 14 is constructed such that one axial end thereof fits into one axial end of solenoid coil 12; valve body piece 16 is constructed such that one axial end thereof fits into the opposite axial end of solenoid coil 12. O-ring seals 36 and 38 provide fluid-tight joints for these fits.

Valve body piece 14 comprises a multiple shouldered central circular through-bore 40. A segment of this through-bore provides a guide bore for armature piece 20. A shim member 42, a seat member 44, and an orifice plate member 46 are secured within through-bore 40 at port 26. Spring 24 is arranged between valve body piece 16 and armature piece 20 for resiliently biasing armature assembly 18 toward valve body piece 14.

Valve body piece 16 comprises a multiple shouldered central circular through-bore 48 within which are secured a needle guide member 50 and a seat member 52. A fluid flow restrictor element 54 is force-fitted within through-bore 48, as is a tubular element 56 that supports a transverse filter screen 57 across port 30.

A tubular shell 58 surrounds solenoid coil 12 and has its opposite axial ends staked to valve body pieces 14 and 16 in the manner shown. The solenoid valve also mounts external O-ring seals 60, 62, and 64 in the manner shown for sealing of the solenoid valve to the fluid circuit with which it is intended to be used. A filter element 66 covers port 28 and is held in place by retention band structure 68.

The internal fluid passageway structure comprises a skewed bore 70 which extends from port 28 to intercept through-bore 48 at a location which is between spring 24 and needle guide member 50, and a straight radial bore 72 which extends from port 28 to intercept through-bore 48 at a location adjacent the more interior axial end of restrictor element 54.

The position depicted by FIG. 1 is for solenoid coil 12 not electrically energized, and in this position spring 24 forces one axial end of needle 22 into seating engagement with seat member 44 while the opposite axial end of needle 22 is unseated from seat member 52. The spacing distance between the end of needle 22 and seat member 52 is somewhat exaggerated for illustrative purposes.

While details of flow restrictor element 54 are disclosed in FIGS. 5–7 and will be explained later on, it may for the moment be said that the co-operative effect between the flow restrictor element and the wall of that segment of through-bore 48 within which it is disposed is to create two parallel flow paths, one of which is relatively more restricted and the other of which is relatively less restricted. A relatively more restricted flow path extends between ports 28 and 30 and includes a series of restrictions that exists between the outside of element 54 and the wall of the segment of through-bore 48 containing the element. A relatively less restricted flow path between ports 28 and 30 is via a central circular through-hole 74 in element 54, and for the position illustrated by FIG. 1 where needle 22 is unseated from seat member 52, the relatively less restricted flow path continues from element 54 through members 52 and 50, through through-bore 48, and through skewed bore 70.

When solenoid coil 12 is suitable electrically energized, armature assembly 18 is displaced from the illustrated position to unseat needle 22 from seat member 44 and to close the relatively less restricted parallel flow path between ports 28 and 30 by seating the needle on seat member 52.

Armature piece 20 possesses a novel construction for improved valve response, particularly in high pressure applications, and where the available voltage for operating the solenoid may drop significantly below the nominal operating potential. To this end armature piece 20 may be said to comprises a "hat-shaped" configuration. As disclosed in full detail by FIGS. 2-4, this construction is embodied by a circular cylindrical main body 76 that is surrounded at one axial end by a circular flange 78. A central circular hole 80 for needle 22 passes completely through armature piece 20 and contains a circular counterbore 82 at the same axial end as flange 78. This counterbore forms a spring seat for one end of spring 24. The other end of the spring seats in a counterbore 85 as shown in FIG. 1. Armature piece 20 and needle 22 are joined by an suitable means to form the armature assembly 18.

A number of channels therein provide for passage of fluid past armature piece 20. There are four straight radial channels 84 in the face of the armature piece that is juxtaposed to the interior axial end of valve body piece 16. Channels 84 are open toward body piece 16 and are spaced ninety degrees apart about the armature's longitudinal axis. Each channel 84 extends from a point of communication with counterbore 82 to the radially outer edge surface of flange 78.

There are also four axial channels 86 that extend completely through flange 78. These channels are spaced ninety degrees apart around the armature piece and each is in communication with the radially outer end of a corresponding channel 84, and is open toward the wall of through-bore 40.

Channels 88 extend from flange 78 axially along the length of main body 76 to the end opposite flange 78. Channels 88 are arranged ninety degrees apart and are in circumferential registry with channels 84 and 86. As can be seen in FIG. 1, the organization and arrangement of solenoid coil 12 and valve body parts 14 and 16 are such that an interior space 90 is provided between parts 14 and 16 and this space is bounded by an annular wall surface of the encapsulating material 34. Flange 78 is disposed within this space, preferably in slightly inwardly spaced relation to the encapsulation surface. The spacing distance between parts 14 and 16 provides for the axial travel of flange 78 with the armature assembly, and also a suitable clearance for passage of fluid between channels 86 and 88. Immediately axially adjacent flange 78, each channel 88 is shaped to comprise a taper that becomes radially larger in the direction away from the flange. This taper ceases at a location where the radial dimension of the channel becomes constant. This shape is intended to promote smooth axial flow as the fluid passes along the armature.

Armature piece 20, body pieces 14 and 16, and shell 58 are of magnetically permeable material. A working gap 92 exists between the juxtaposed faces of armature piece 20 and valve body piece 16. With solenoid coil 12 not energized, this working gap has a maximum axial dimension; when the solenoid coil is suitably energized, the magnetic flux acts to attract armature piece 20 toward valve body piece 16 with the result that the axial dimension of the working gap is reduced. The construction of the armature piece is advantageous because the flange 78 can conduct a portion of the magnetic flux that would otherwise stray from the magnetically saturated permeable material of the armature piece. Because the flange is on a substantial radius, it can provide a significant increase in area for the magnetic flux even though its radial dimension is relatively small. Flange 78 serves to augment the attractive force that is exerted on the armature assembly when the solenoid coil is energized. Yet, the organization and arrangement is also advantageous at solenoid coil de-energization. The presence of flange 78 allows the channel structure to be incorporated into armature piece 20, and so the fluid passageways that are provided by the channel structure in the armature piece attenuate the fluid's stiction effects and residual magnetic field break-down on the armature motion so that spring 24 will be capable of quickly releasing its stored energy with maximum effectiveness when the solenoid coil is de-energized.

One of the advantages of the hat-shaped armature piece is that relatively large armature lifts can be achieved. The lift is established by the thickness of shim member 42, which can also perform a needle guide function, and it may be noticed that member 42 contains one or more holes 42a to allow fluid to pass freely through itself.

Details of restrictor element 54 are presented in FIGS. 5-7. It comprises a circular cylindrical central core 94 that has a plurality of axially spaced apart flanges 96a, 96b, 96c, 96d, 96e, 96f, 96g, 96h, 96i that are integral with core 94. A series of axially spaced apart annular gaps 98a, 98b, 98c, 98d, 98e, 98f, 98g, 98h are thereby provided. Each flange 96a, 96b, 96c, 96d, 96e, 96f, 96g, 96h has a circularly contoured radially outer edge surface that is interrupted by at least one axially extending through-notch. For each of the flanges 96a, 96b, 96c, 96d there are four through-notches 100 arranged at ninety degrees around the flange. The through-notches 100 of each flange are in circumferential registry with those of the other three flanges. Each through-notch 100 is open in the radially outward direction and has spaced apart parallel side edge surfaces which are bridged by a root edge surface so that the shape is generally rectangular. For each of the flanges 96e, 96f, 96g, 96h there is only a single through-notch 102, and the through-notches 102 of immediately consecutive flanges are diametrically opposite each other about the central longitudinal axis of the restrictor element, and are also out of registry with the through-notches 100 by forty-five degrees. Each through-notch 102 has a single edge surface that lies on a chord of an imaginary circle that defined by the circularly contoured outer edge surface of its flange. Flange 96*i* has a circumferentially continuous, uninterrupted circular edge surface.

The restrictor element is designed for a force fit with the wall of that segment of through-bore 48 within which it is disposed. Thus the perimeter of each flange may be considered as essentially sealed to the through-bore wall except where it is interrupted by a through-notch. When the restrictor element is viewed axially in its assembled relationship in the valve, the four through-notches 100 of each flange 96*a*, 96*b*, 96*c*, 96*d* have a much greater total area than does the single through-notch 102 of each flange 96*e*, 96*f*, 96*g*, 96*h*. Thus it is the through-notches 102 that provide the restrictive effect on fluid flow that takes place between the restrictor element and the wall of the through-bore segment into which it is force-fitted. The end flange 96*i* forms a complete closure with the wall of the through-bore since it lacks any through-notch.

Part 56 contains suitable notches at its interior axial end to provide fluid communication of port 30 to the through-notches 100 of flange 96*a*. From there communication with port 28 takes place through the through-notches 100, 102 and gaps 98, the gap 98*h* being in communication with radial bore 72.

Restrictor element 54 is advantageously fabricated by die casting or plastic molding techniques so that it has a unitary one-piece construction, as distinguished from the multi-piece stacked disc construction of prior restrictors. By selection of a suitable material it is possible for the restrictor element to better compensate for temperature-induced fluid viscosity changes than prior restrictors.

It should be understood that the specific embodiment of restrictor element that has been illustrated is exemplary. The number of flanges and the sizes and locations of the various through-notches will be a function of the particular specifications with which the restrictor element must comply when in use. Where a restrictor element must be available in certain different models, it is possible to satisfy different model requirements by fabricating a complete restrictor element as one model, and then shearing off a portion of the length of the complete element to yield a shorter length model having the appropriate number of flanges for achieving the desired restrictive effect, or by using multiple inserts in the mold.

The specific embodiment of valve 10 that is illustrated in FIG. 1 is intended for use in one specific automotive ABS system, and is sometimes referred to as a two-way valve, either with or without a restrictor. The valve may be generally described as a vented two-way valve. When the solenoid is de-energized, needle 22 is unseated from seat member 52 so that what amounts to an unrestricted flow path exists between ports 28 and 30. This unrestricted flow path extends from port 30, through screen 57, through part 56, through through-hole 74, through a central hole 52*a* in member 52, through a pattern of holes 50*a* in member 50, through through-bore 48, through skewed bore 70, and through screen 66 to port 28. When the solenoid is fully energized, the closure of hole 52*a* by needle 22 closes this unrestricted flow path so that only what is referred to as a restricted flow path exists. This restricted flow path extends from port 30, through screen 57, through part 56, through the restricted path between the side of restrictor element 54 and the wall of through-bore 48, through radial bore 72, and through filter screen 66 to port 28. Although member 44 is shown to comprise a central hole 44*a* that is closed when the solenoid is de-energized, it also comprises a hole 44*b* that always remains open. Thus the solenoid valve is always vented to port 26 irrespective of the condition of solenoid energization. Orifice plate member 46 contains suitable orifice means that is used to control the vent rate.

Other valve configurations are also contemplated, for example a three-way pulse width modulated valve. These other configurations may involve various modifications of the construction illustrated in FIG. 1. Such modifications may include changes to and/or relocations and/or omissions of one or more of the valve's parts, such as members 42, 44, 46, 50, 52, 54.

What is claimed is:

1. A fluid valve that comprises valve body structure having fluid passageway means extending between porting via which the valve is adapted to be connected in a fluid circuit, said fluid passageway means comprising two parallel flow paths through which said valve selectively controls fluid flow, and one of which imposes a substantially greater restriction to fluid flow than the other, wherein the improvement comprises:

said two parallel flow paths being co-operatively defined by a unitary one-piece element that is force-fitted into a walled bore in said valve body structure, said element comprising a main body having a through-hole forming at least a segment of said other of said parallel flow paths and plural axially spaced apart annular flange means integral with said main body, each of said annular flange means extending radially outwardly from said main body and against the wall of said bore, each of said flange means, when viewed axially, having a non-circular shape so as to define co-operatively with the wall of said bore a through-opening forming a segment of said one of said two parallel flow paths, said through-openings cumulatively forming a greater restriction to fluid flow than does said through-hole, and selectively operable valve means to select which of said two parallel flow paths is to conduct fluid flow through said fluid passageway means.

2. The improvement set forth in claim 1 in which each annular flange means comprises a circularly contoured radially outer edge surface that is interrupted by one or more radially inwardly extending notches.

3. The improvement set forth in claim 2 in which said one or more radially inwardly extending notches is radially inwardly bounded by an edge surface thereof that lies on a chord of an imaginary circle defined by the circularly contoured radially outer edge of the corresponding annular flange means.

4. The improvement set forth in claim 2 in which said one or more radially inwardly extending notches of at least one of said annular flange means is constructed so as to provide a restriction to fluid flow in said one of said two parallel flow paths which is substantially less than the restriction to fluid flow in said one of said two parallel flow paths which is provided by the construction of said one or more notches of at least one other of said annular flange means.

5. The improvement set forth in claim 4 in which said one or more notches of said at least one other of said annular flange means comprises side edge surfaces that are in juxtaposition to each other across the circumferential extent of said one or more notches of said at least one other of said annular flange means.

6. The improvement set forth in claim 5 in which said side edge surfaces of said one or more notches of said at least one other of said annular flange means are substantially mutually parallel.

7. The improvement set forth in claim 2 in which two of said annular flange means each comprises only a single notch and these single notches are disposed in non-circumferential registry.

8. The improvement set forth in claim 7 in which said single notches are diametrically opposite each other.

9. The improvement set forth in claim 7 in which each of said single notches is radially inwardly bounded by an edge surface of the corresponding annular flange means which lies on a chord of an imaginary circle defined by the circularly contoured radially outer edge of the corresponding annular flange means.

10. The improvement set forth in claim 7 in which said two of said annular flange means are axially consecutive.

11. The improvement set forth in claim 2 in which two of said annular flange means comprise respective one or more radially inwardly extending notches which are in non-circumferential registry.

* * * * *